April 21, 1925

Re. 16,046

R. A. GREENE

NUT MILL

Original Filed Sept. 4, 1920 3 Sheets-Sheet 1

INVENTOR

Richard A. Greene,

BY P. Wooster

ATTORNEY

April 21, 1925. Re. 16,046

R. A. GREENE

NUT MILL

Original Filed Sept. 4, 1920 3 Sheets-Sheet 2

INVENTOR
Richard A. Greene,
BY P. Mooter.
ATTORNEY

April 21, 1925. Re. 16,046

R. A. GREENE

NUT MILL

Original Filed Sept. 4, 1920 3 Sheets-Sheet 3

INVENTOR
Richard A. Greene
BY
J. D. Morton
ATTORNEY

Reissued Apr. 21, 1925. Re. 16,046

UNITED STATES PATENT OFFICE.

RICHARD A. GREENE, OF BROOKLYN, NEW YORK, ASSIGNOR TO JABEZ BURNS & SONS, A CORPORATION OF NEW YORK.

NUT MILL.

Original No. 1,394,082, dated October 18, 1921, Serial No. 408,124, filed September 4, 1920. Application for reissue filed October 11, 1923. Serial No. 668,020.

*To all whom it may concern:*

Be it known that I, RICHARD A. GREENE, a citizen of the United States, and a resident of Brooklyn, in the county of Kings and State of New York, have invented certain new and useful Improvements in Nut Mills, of which the following is a specification.

This invention relates to grinding mills, more particularly to force feed and force discharge mills especially intended for grinding nuts or such similar edible oily or fatty bodies.

The consumption of peanut butter is constantly increasing and a demand has arisen for a nut mill which will have a large capacity of uniform output for a prolonged period, without shut downs for repairs, cleaning, sharpening of grinders, etc.

In previous patents issued to me, nut mills are disclosed which are superior in output and longevity to previous mills, but the demands of the trade for constantly greater output and reduced number of shutdowns for sharpening, cleaning and repairs, have necessitated an intensive and extended study of the entire problem, resulting in the present invention by which extremely satisfactory results are obtained.

I have found that the maximum output for a given size of mill, with minimum sharpening of grinders, and avoidance of excessive stresses in the machine (particularly the thrust bea g which has heretofore been a source . . trouble) is obtained by the combination of a forced feed screw cooperating with a suitably, preferably longitudinally, grooved casing feeding the nuts positively under heavy pressure to flat grinding disks and maintaining the heavy pressure on the nuts by means of a tapering reduction passage not only to, but entirely through the grinders to the discharge. By this combination, not only is the output as compared with previous mills either of the cone or disk type substantially increased, but I have discovered that flat disks do not require such frequent sharpening, and the strain on the thrust bearing is not as great for a given output with flat disks as with cone grinders.

For example, I have found that new grinders when pushed to capacity, lose within a comparatively short time, a percentage of efficiency. With cone grinders, the loss of efficiency is not only greater but more rapid and progressive than with disk grinders, while increase of power simply dulls such grinders more rapidly and increases the thrust bearing load, the limits being either breaking of the bearing, stoppage of feed by the feed screw and casing grooves clogging up, or stalling of the motor. With disk grinders on the contrary, I have found that the pressures on the thrust bearing are decidedly less; the feed does not clog up; nor does the efficiency of disks substantially drop for a long time after the initial drop always met with new disks. The motor may of course be stalled under some conditions, but my experience seems to indicate that an essential condition for a high efficiency disk mill is that the pressure must be maintained throughout the disks until the actual grinding and discharge under pressure from the disks is effected.

An advantage obtained by a discharge under pressure is that by employing a strong pressure resisting casing with a discharge spout, the nut butter comes out in a solid pasty mass free from air bubbles and can be readily filled directly into small containers commonly used in the retail trade, while heretofore, it has been necessary to provide a small machine, such as a meat chopper, to compress the ground nuts for filling into jars.

This invention further comprises the specific structure whereby the mill can be quickly disassembled for cleaning, and also renewal of the feed screw casing as a unit had when worn, without excessive expense.

In the accompanying drawings,

Fig. 3 is a detail;

Figure 1:
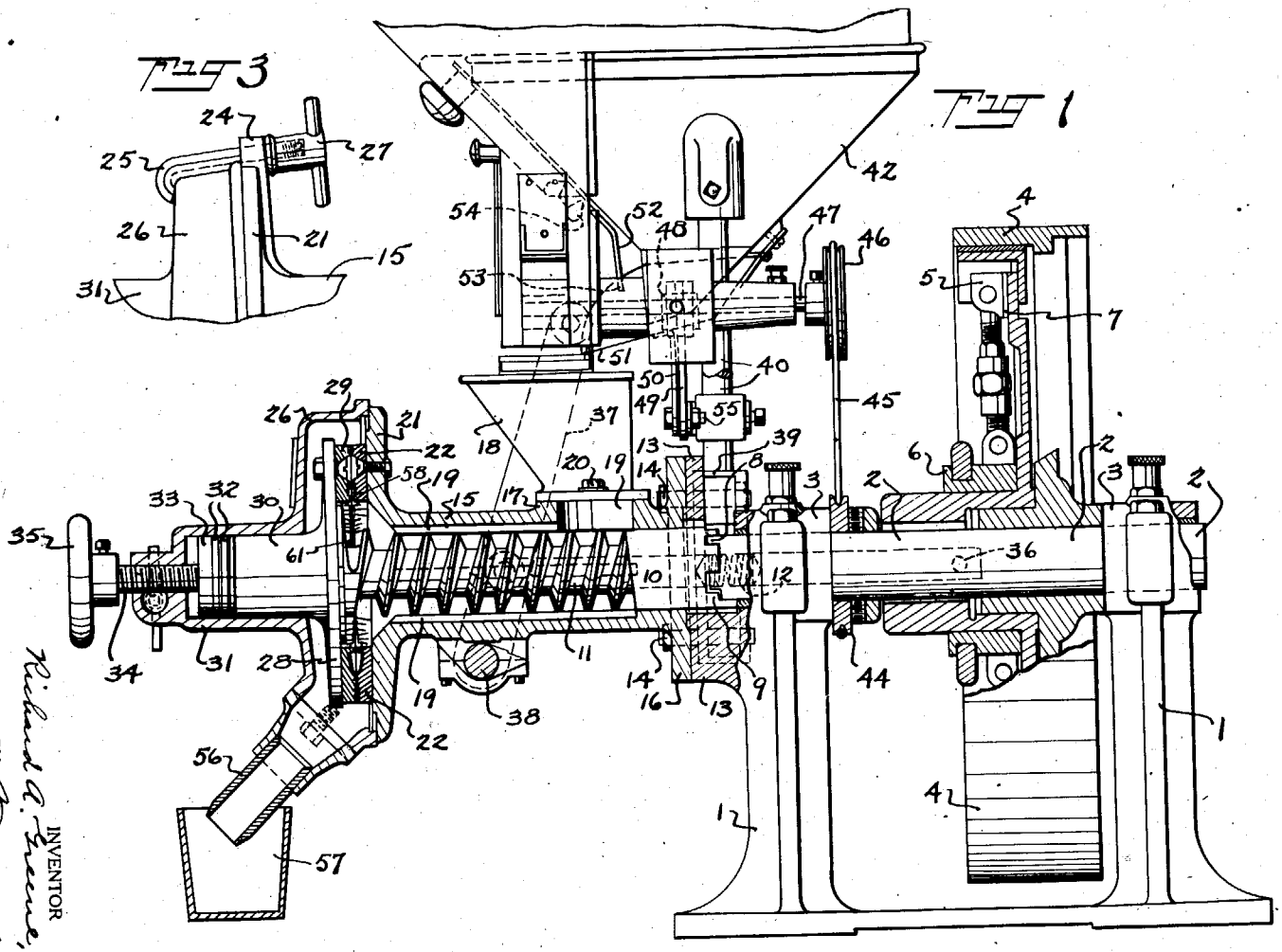
Figure 1 is an elevation partly in section of a grinder embodying the invention.
Figure 2:
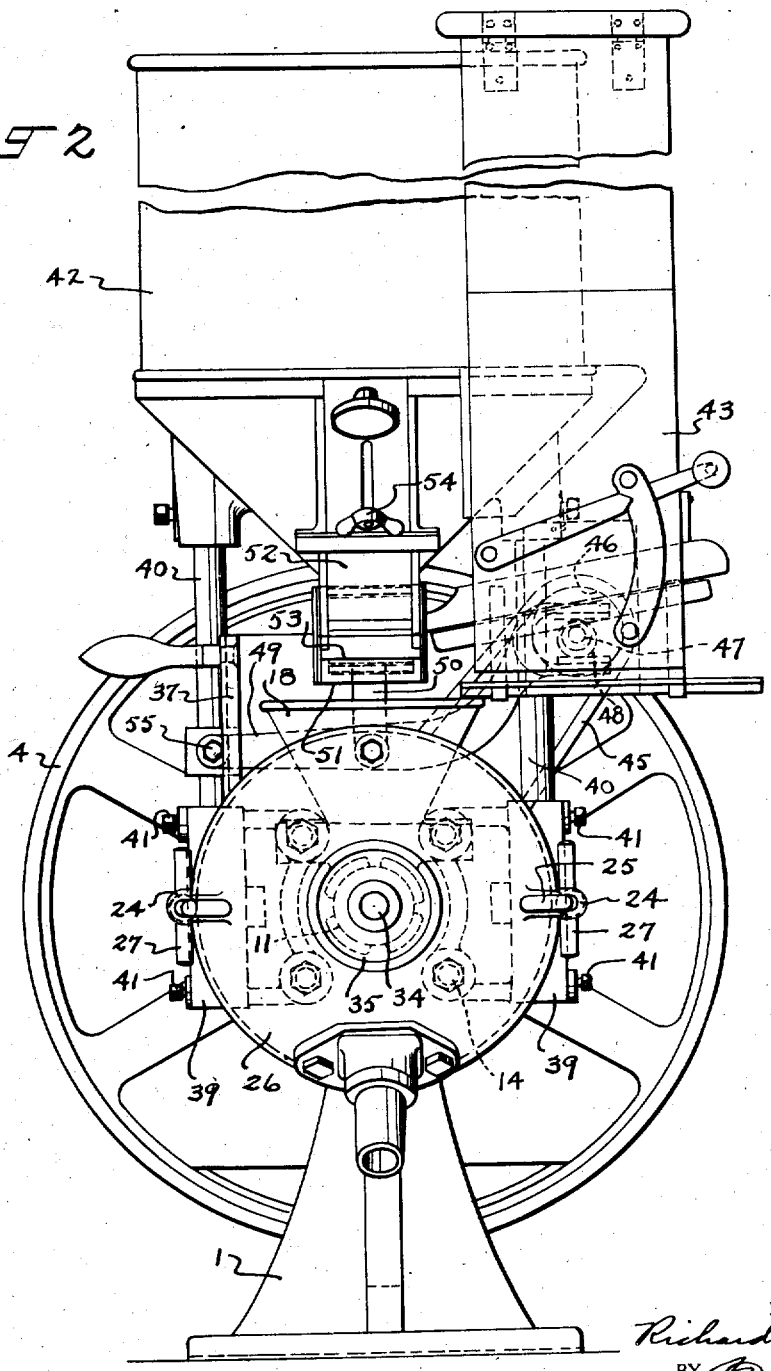
Fig. 2 is an end view.

Referring to the drawings, 1 is a main supporting frame formed of two spaced pedestals connected at the lower ends by a web. The upper ends of these pedestals have journals 3 carrying the power shaft 2.

4 is a driving pulley loosely mounted on shaft 2, and 5 is a clutch operated by collar 6 from a hand shifting lever pivoted on the feed screw casing 15, for clutching the pulley 4 to shaft 2 through the clutch member 7 keyed to shaft 2.

The end of the shaft 2 is provided with clutch teeth 8 which interlock with corresponding teeth 9 on the solid end 10 of slow pitch feed screw 11 to drive the latter. The ends of the shaft 2 and the feed screw are recessed to receive the coil spring 12, tending to hold the grinders apart. The end of the frame 1 is provided with a boss or flange 13, to which is separably bolted by bolts 14 through flange 16 the feed screw casing 15. This feed screw casing is a casting having a boss 17 around opening 19 to receive the supply chute 18, discharging over the inner end of feed screw 11. The casing 15 is also provided with straight longitudinal feed grooves $19^1$. With straight grooves, it has been found by actual experience that the feed screw is much more positive than if the grooves are spiral, and with less tendency to clogging. As shown herein, there are four ribs and four grooves, one of the ribs being shown in dotted lines behind the feed screw in Fig. 1. The chute 18 is separably attached to the boss 17 by means of bolts 20.

The end of the feed screw casing 15 is provided with a flange 21 carrying the stationary annular disk grinder 22 by bolts 23. The feed screw casing, being most subject to wear, is made renewable as a unit. The design of ribs and grooves may be left to individual choice, except that both grinders are of plane annular form with non-radial grooves below the surface.

Figure 4:
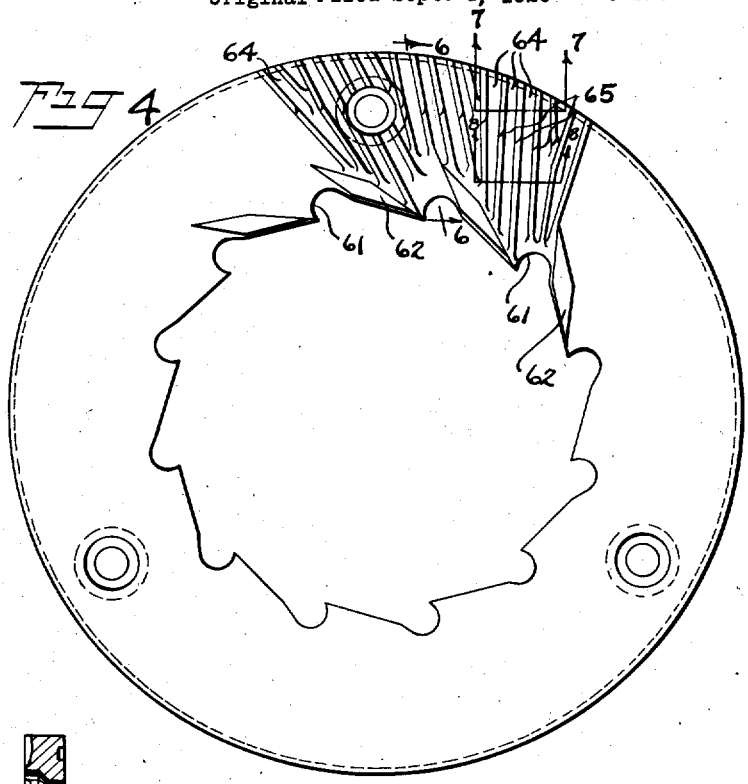
Fig. 4 is a face view of one of the annular grinders.
Figure 5:
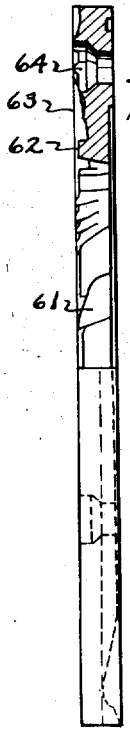
Fig. 5 is a section.
Figure 6:
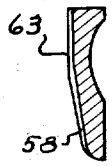
Fig. 6 is a section on the line 6—6 of Fig. 4.
Figure 7:
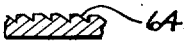
Fig. 7 is a section on the line 7—7 of Fig. 4.
Figure 8:
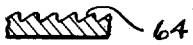
Fig. 8 is a section on the line 8—8 of Fig. 4.

The grinders 22, 29 may be alike, and Figs. 4 and 8 show a satisfactory design. Each grinder is mounted by means of three bolts 60 to its supporting element and Fig. 6 shows how the tapering reduction passage 58 is formed, this passage of course differing slightly at different points on the grinder. Generally the inner periphery of the grinder is serrated, as by indentations 61, and immediately beyond these indentations are flat surfaces 62 somewhat below the main plane surface 63 of the grinder, while beyond the flat portions 62 are non-radial grooves 64, the section of which is shown in Fig. 8 up to the points 65 in Fig. 4 and from then on is shown in Fig. 7, it being seen that the teeth formed by these grooves project in one direction and are somewhat rounded in Fig. 8, while the outer teeth in Fig. 7 project in the other direction and are flat on top, while the fastening bolts 60 are roughened or grooved in a similar manner. It results from this that the course of the material in the grooves is in short zig-zags between the grinders and all of the material eventually has to pass between the flat surfaces owing to it having a radial movement by the pressure of the feed, modified by a circumferential movement due to the moving grinder, and both of these movements being modified by the grooves.

As will be seen from Fig. 1, the feed screw tapers outwardly at the grinder end into a slightly conical portion which fits within the movable grinder annulus 29, the latter being bolted to the flange 28 of the feed screw. Beyond the flange 28 is the bearing portion 30 revolving in the cylindrical extension 31 of casing 26. The bearing is closely fitted to prevent escape of oil from the nuts, or may be specially packed, as the heavy pressure will force the oil into every crevice, unless prevented, and peanut oil is of little or no lubricating value. Beyond the end of the bearing portion 30 is a ball thrust bearing 32 and a thrust block 33 controlled by a screw 34 threaded in the outer end of the cover and operated by hand wheels 35, this screw and thrust mechanism operating through the feed screw against the spring 12.

Just within the inner periphery of grinder 22 the casing is flared as shown in Fig. 1, while as shown in the same figure, the grinders are recessed on their inner portions to form a tapering reduction passage 58 leading to the relatively narrow outer flat grinding faces proper. From this construction, it results that there is no release of pressure on the nuts after the passages are once filled, and the passage area progressively reduces (by reason of the flared casing, the conical portion on the feed screw, and the space 58), so that the pressure increases to a maximum at the peripheral grinding portions of the annular grinders, at least partial crushing having previously taken place. Owing to the relatively narrow flat grinding faces at the periphery of the grinders, friction, with objectionable heating of the nut paste, does not become excessive in maintaining the pressure through and beyond the grinders. Also, there are no unobstructed radial passages in the flat grinding portions through which unground material can flow, as it certainly would do if not prevented, owing to the heavy pressure employed. With this mill, new grinders show after a short time, a slight reduction in efficiency, but thereafter work for prolonged periods with very little change, while conical grinders constantly lose efficiency.

The flange 21 carries lugs 24 through which pass clamp hooks 25 which engage with the pressure resisting close fitting casing 26, the rear ends of the screws being threaded and carrying wing nuts 27 for holding the casing tightly against flange 21, a gasket preferably being used between the cover and the flange to maintain a tight joint against oil which might be forced out, owing to the heavy pressure at this point. By this means, the casing readily centers itself, and can be set so that the spout 56 discharges at any desired angle.

The clutch collar 6 is connected by links 36 to an operating handle 37 pivoted at 38 on the feed screw casing 15 for purposes of convenience, as the operating handle 37 could equally well be pivoted on the frame 1. The bolts 14 constitute studs threaded into the flange 13 and carry the detachable feed casing, etc., as before described on one end, while on the other end, these same studs carry casting 39 having sockets to receive rods 40 secured by set screws 41. The rods 40 carry the nut hopper 42 and seasoning hopper 43, the former having a bottom shaking mechanism 51 shaken from pulley 44 through belt 45 to pulley 46 on shaft 47 having eccentric 48 through forked lever 49 pivoted at 55 on one of the rods 40 and shaking the bottom through link 50, thereby discharging the nuts into chute 18. 52 is the adjustable gate by which the feed to 51 is controlled, this gate having a depending end 53 which abuts against the sides of the hopper bottom when in lowest position, and set by wing nut 54.

The nuts to be ground are fed to screw 11 and are immediately taken by that screw and positively forced under pressure along the casing, any tendency to jam or become solidly packed being resisted by the longitudinal grooves 19. The nuts are positively forced under, between and from the disk grinders into the chamber surrounding the disks. Air is forced out by the pressure and after the first of the paste comes out of spout 56, the remainder comes out forcibly in a continuous solid and homogeneous stream with no voids or air bubbles. It will be seen that pressure is constantly on the nuts from the time they first pass into the feed screw casing until the paste issues at the spout 56.

As the paste issues from spout 56 it is received in a container 57 which is held at the mouth of the spout and may be filled completely with paste, without voids or air bubbles because the manner in which the paste issues from the nozzle 56 allows it to flow upwardly from the bottom of the container 57, thus preventing voids and air bubbles.

It should be particularly noted that I employ annular disk grinders and not conical grinders, as I have discovered that they are not equivalents, because the combination of the described force feed with disk grinders having non-radial grooves enables me to obtain a higher output of homogeneous paste for a longer time without sharpening, and to maintain a pressure on the paste issuing from the nozzle without overheating and not necessitating artificial cooling. The difference is so marked compared with prior machines, that it evidently results from some attribute which has not heretofore been discovered, namely, that the pressure wears out conical grinders and the thrust, with excessive heating, and merely absorbs a large amount of power, with actual reduction of output.

The facility afforded in this machine for cleaning is quite apparent. The quickly removable casing permits endwise withdrawal of the feed screw carrying the movable grinder without releasing any other connections, owing to the interlocking slip joint between the shaft 2 and the feed screw. When the cover is put back and the clamp 27 tightened the thrust adjustment has not been changed and the machine can go on running as before, without being readjusted.

If it is desired to clean or inspect feed casing 15 it is only necessary to remove the bolts 14 and the feed casing is in hand ready for any kind of cleaning desired and all without disturbing any other essential parts of the mill. The thrust adjustment is not changed, nor is the hopper or seasoning device dismounted. Moreover, I have found it cheaper to make the longitudinal grooved casing a renewable unit as here shown than as a renewable bushing requiring considerable machine work and considerable dismounting to replace and set.

What I claim is:

1. A mill for grinding peanuts and the like into smooth paste comprising a frame carrying a hopper for nuts, a feed screw casing having internal longitudinal grooves with an opening to receive the nuts to be ground, a slow pitch feed screw in said casing cooperating with said longitudinal grooves to feed the nuts forward under pressure, an annular flat grinder carried at the end of the feed screw, a stationary annular disk grinder cooperating therewith, means for resisting the thrust of the grinders, the end of the feed casing, the feed screw and the grinders being formed to provide a progressively narrowing passage to the flat faces of the grinders to maintain the nuts under increasing pressure between the feed screw and the periphery of the grinders, and the flat faces of the grinders having non-radial grooves therein, whereby pressure is maintained on the nuts by the feed to and through the grinders without overheating and without excessive thrust.

2. A mill for grinding peanuts and the like into smooth paste comprising a frame carrying a hopper for nuts, a feed screw casing having internal longitudinal grooves with an opening to receive the nuts to be ground, a slow pitch feed screw in said casing cooperating with said longitudinal grooves to feed the nuts forward under pressure, an annular flat grinder carried at the end of the feed screw, a stationary annular disk grinder cooperating therewith, means for resisting the thrust of the grinders, the end of the feed casing, the feed screw and the grinders being formed to provide a progressively narrowing passage to the flat faces of the grinders to maintain the nuts under increasing pressure between the feed screw and the periphery of the grinders, and the flat faces of the grinders having non-radial grooves therein, and a pressure resisting casing inclosing the grinders and having a discharge spout, whereby pressure is maintained on the nuts by the feed to and through the grinders and within the casing to the spout without overheating and without excessive thrust.

3. A renewable feed screw casing for a peanut mill comprising a hollow body having longitudinal internal grooves carrying a flange at each end, one flange being attachable to the frame of the mill and the other being adapted to carry an annular grinder and a fitted cover, and the body having an opening for supplying nuts adjacent the former flange.

4. A mill comprising a frame carrying a driving shaft and a feed hopper, a feed screw casing comprising a tubular longitudinally grooved body attachable at one end to the frame and having a flange at the other end, a feed screw in said casing separably interlocking with said shaft, a movable annular grinder mounted on the feed screw beyond the feed screw casing flange, a cooperating annular grinder mounted on said flange, a pressure resisting cover having a discharge spout separably secured to said feed screw casing flange and also having an end bearing for the feed screw, and an adjustable thrust bearing member carried by the casing and cooperating with the bearing end of the feed screw.

5. A mill comprising a base carrying a driving shaft, a feed casing separably secured at one end to said base in line with said shaft and carrying a grinder at the other end, a hopper discharging through said casing, and a feed screw in said casing supported at both ends by said casing and separably interlocking with said drive shaft at its inner end and carrying a grinder at its outer end cooperating with said first grinder.

6. In a mill having a rotatable and a stationary grinder and a feed screw connected to the rotatable grinder feeding through the center of the stationary grinder, an interiorly grooved casing for the feed screw supporting the feed screw at both ends constituting a renewable unit separably attached to the frame of the machine at one end and carrying the stationary grinder at the other end.

7. A nut mill comprising a base carrying a driving shaft, a feed casing on the base having interior feed grooves and connection with a hopper, a fixed grinder at the end of the feed casing, a feed screw within the casing supported at both ends by the casing and having separable interlocking connection with the driving shaft, a movable grinder carried by the end of the feed screw cooperating with the stationary grinder, and means for regulating the space between said grinders.

8. A nut mill comprising a base carrying a driving shaft, a feed casing on the base having interior feed grooves and connection with a hopper, a fixed grinder at the end of the feed casing, a feed screw within the casing supported at both ends by the casing and having separable interlocking connection with the driving shaft, a movable grinder carried by the end of the feed screw cooperating with the stationary grinder, and means for holding the feed screw in driving connection with the shaft and the movable grinder in cooperative grinding relation to the fixed grinder.

9. A nut mill comprising a base carrying a driving shaft, a feed casing on the base having interior feed grooves and connection with a hopper, a fixed grinder at the end of the feed casing, a feed screw within the casing supported at both ends by the casing and having separable interlocking connection with the driving shaft, a movable grinder carried by the end of the feed screw cooperating with the stationary grinder, and means for regulating the space between said grinders comprising a spring for forcing the feed screw axially relatively to the drive shaft at the driving connection and an adjustable abutment for controlling such movement.

10. A nut mill comprising a base carrying a driving shaft, a feed casing on the base having interior feed grooves and connection with a hopper, a fixed grinder at the end of the feed casing, a feed screw within the casing supported at both ends by the casing and having separable interlocking connection with the driving shaft, a movable grinder carried by the end of the feed screw cooperating with the stationary grinder, and means for regulating the space between said grinders comprising a spring between the inner end of the feed screw and the end of the drive shaft tending to separate screw and shaft, and an adjustable thrust bearing carried by the casing beyond the movable grinder for moving the feed screw and grinder against said spring to adjust the grinding space without disconnecting the feed screw and shaft.

11. A mill for grinding peanuts and the like into smooth paste comprising a pair of grinding disks having opposed grinding faces provided with discontinuous nonradial grooves, means for rotating one of said disks, means for feeding the peanuts under pressure between said disks, a pressure resisting casing around said disks, and a discharge spout to discharge the ground paste under pressure free from voids and air bubbles.

12. A mill for grinding peanuts and the like into smooth paste comprising a frame carrying driving means, a tubular feed screw casing detachably connected at one end thereto, having internal feed grooves and an opening through the side to receive nuts, a fixed grinder carried by the other end of said tubular casing, a feed screw in said casing and having separable driving connection with said driving means, a movable grinder carried by said feed screw, a delivery casing carried by the feed screw casing inclosing said grinders and having a spout for delivering the ground paste under pressure, and thrust and supporting bearings for the other end of the feed screw in said latter casing.

13. A flat disk mill for grinding peanuts and the like into a smooth paste and delivering same under pressure from a spout for directly and solidly packing into containers, comprising a longitudinally grooved tubular feed screw casing receiving the nuts to be ground, a feed screw for feeding them therethrough under pressure, flat grinding disks, one being movable, for receiving the nuts under pressure and maintaining the pressure while the nuts are being ground, a pressure resisting casing surrounding the grinders to receive the ground paste and hold it under pressure, and a discharge spout on said casing for discharging the paste under pressure directly into a container.

14. A flat disk mill for grinding nuts into smooth paste and packing it directly into containers under pressure and without voids, comprising a hopper for the nuts, a feed screw casing receiving nuts from the hopper, a feed screw in the casing for feeding the nuts under pressure, a fixed disk grinder and a movable disk grinder constructed and arranged to receive and grind the nuts to smooth paste and discharge the paste under pressure, and a casing having a discharge spout adapted to be inserted in the container to be filled, said casing holding and discharging the paste under pressure whereby it may be filled into the container free of voids.

15. In a mill for grinding nuts to paste and seasoning same, a main frame carrying driving mechanism and hoppers for nuts and seasoning material, means for controlling the feed of seasoning material, and grinding mechanism detachably connected to the frame comprising a tubular feed screw casing having an opening receiving the discharge of nuts and seasoning material to be ground, a feed screw in said casing having detachable interlocking driving connection with said driving mechanism, a fixed grinder carried by said feed screw casing, and a cooperating movable grinder carried by the feed screw.

16. A mill for grinding nuts into smooth paste comprising a pair of grinding disks having coacting grinding faces constructed to reduce nuts to paste, a tapering passage leading to said grinding faces, and a continuously acting slow pitch feed screw constructed to positively feed the nuts under continuously increasing high pressure into said passage and between the disks.

17. A mill for grinding nuts into smooth paste comprising a pair of grinding disks having coacting grinding faces constructed to reduce nuts to paste, a tapering passage leading to said grinding faces, a slow pitch pressure feed screw and coacting longitudinally grooved feed casing constructed to positively feed the nuts under high pressure into said passage, and means for feeding nuts into the casing.

18. A mill for grinding peanuts and the like comprising a pair of substantially plane disks having opposed grinding faces with gradually reducing passages, means for rotating one of said disks, means for feeding the nuts under pressure between said disks, a pressure resisting casing around said disks, and a discharge spout to discharge the ground paste under pressure.

19. In a mill for grinding nuts to paste, a hopper for the nuts, a feed-screw casing having an opening to receive material from the hopper, grinding disks located beyond the feed screw casing, a feed screw within the feed screw casing adapted to feed the nuts under pressure from the hopper to the grinding means, and a pressure casing surrounding the disks and having a spout for discharging the ground nut paste into a container.

Signed at New York City, in the county of New York and State of New York this 10 day of October, 1923.

RICHARD A. GREENE.